US011427188B2

(12) United States Patent
Sugano (10) Patent No.: US 11,427,188 B2
(45) Date of Patent: Aug. 30, 2022

(54) AUTOMATED VALET PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/934,262

(22) Filed: Jul. 21, 2020

(65) Prior Publication Data

US 2021/0114585 A1    Apr. 22, 2021

(30) Foreign Application Priority Data

Oct. 17, 2019   (JP) .............................. JP2019-190411

(51) Int. Cl.
*B60W 30/06*   (2006.01)
*B60W 60/00*   (2020.01)
(Continued)

(52) U.S. Cl.
CPC .......... *B60W 30/06* (2013.01); *B60W 40/105* (2013.01); *B60W 60/0025* (2020.02);
(Continued)

(58) Field of Classification Search
CPC ............. B60W 30/06; B60W 60/0025; B60W 40/105; B60W 2520/00; G01C 21/3685; G08G 1/141
See application file for complete search history.

(56) References Cited

U.S. PATENT DOCUMENTS 5,229,941 A * 7/1993 Hattori ................. G05D 1/0217
180/167
8,908,035 B2 * 12/2014 Russ ........................ B60R 1/00
348/148
(Continued)

FOREIGN PATENT DOCUMENTS

CN    102735239 A    10/2012
CN    106556399 A    4/2017
(Continued)

OTHER PUBLICATIONS

U.S. Appl. No. 17/036,987, filed Sep. 29, 2020.
Office Action issued to U.S. Appl. No. 17/036,987 dated Mar. 28, 2022.

*Primary Examiner* — Hussein Elchanti
(74) *Attorney, Agent, or Firm* — Dinsmore & Shohl LLP (57) ABSTRACT

An automated valet parking system identifies a node section where a target vehicle is located based on position information on nodes corresponding to passages in a parking place and on a vehicle position, identifies target nodes that are a predetermined number of the nodes including a next-passing node that is one of not-yet-passed nodes of the target vehicle and is the node that the target vehicle will pass next on a target route, acquires node information associated with the target nodes based on the target nodes and parking place map information, and gives an instruction to the target vehicle by sending the node information on driving boundaries and targets associated with the target nodes to the target vehicle based on the results of a node information acquisition unit, a node section identification unit, and a target node identification unit.

3 Claims, 8 Drawing Sheets

(51) Int. Cl.
*B60W 40/105* (2012.01)
*G08G 1/14* (2006.01)
*G01C 21/36* (2006.01)

(52) U.S. Cl.
CPC ......... *G01C 21/3685* (2013.01); *G08G 1/141* (2013.01); *B60W 2520/00* (2013.01)

(56) References Cited

U.S. PATENT DOCUMENTS

| | | | |
|---|---|---|---|
| 9,557,736 B1 | 1/2017 | Silver et al. | |
| 9,811,085 B1* | 11/2017 | Hayes | G06N 5/04 |
| 9,969,386 B1* | 5/2018 | Wang | B60W 30/06 |
| 10,354,531 B1* | 7/2019 | Bronder | G08G 1/144 |
| 2005/0060073 A1* | 3/2005 | Tanaka | B62D 15/0285 |
| | | | 701/36 |
| 2010/0231416 A1* | 9/2010 | Wu | G08G 1/168 |
| | | | 340/932.2 |
| 2010/0259420 A1* | 10/2010 | Von Reyher | B62D 15/028 |
| | | | 340/932.2 |
| 2011/0304477 A1* | 12/2011 | Yoshihashi | B60W 50/14 |
| | | | 340/932.2 |
| 2012/0296523 A1* | 11/2012 | Ikeda | B62D 15/0275 |
| | | | 701/41 |
| 2014/0114529 A1* | 4/2014 | An | B60W 30/06 |
| | | | 701/36 |
| 2014/0324310 A1* | 10/2014 | Kobayashi | B62D 15/027 |
| | | | 701/70 |
| 2014/0333455 A1* | 11/2014 | Lee | B62D 15/027 |
| | | | 340/932.2 |
| 2015/0278611 A1* | 10/2015 | Chi | B60W 30/12 |
| | | | 348/148 |
| 2017/0285654 A1 | 10/2017 | Nagai et al. | |
| 2017/0323567 A1 | 11/2017 | Nordbruch | |
| 2018/0001930 A1* | 1/2018 | Sham | B62D 15/0285 |
| 2018/0308359 A1* | 10/2018 | Hayakawa | G08G 1/144 |
| 2018/0327028 A1* | 11/2018 | Kamiyama | B60R 1/00 |
| 2019/0066503 A1* | 2/2019 | Li | G05D 1/0276 |
| 2019/0137290 A1* | 5/2019 | Levy | G01C 21/3461 |
| 2020/0001862 A1 | 1/2020 | Luo et al. | |
| 2020/0207334 A1 | 7/2020 | Cho | |
| 2021/0019671 A1* | 1/2021 | Cao | G06Q 30/0284 |
| 2021/0122361 A1 | 4/2021 | Sugano | |

FOREIGN PATENT DOCUMENTS

| | | |
|---|---|---|
| CN | 110139794 A | 8/2019 |
| JP | 2017-182263 A | 10/2017 |
| JP | 2019-036057 A | 3/2019 |
| WO | 2018/131322 A1 | 7/2018 |

* cited by examiner

AUTOMATED VALET PARKING SYSTEM

INCORPORATION BY REFERENCE

This application claims priority to Japanese Patent Application No. 2019-190411 filed on Oct. 17, 2019, which is incorporated herein by reference in its entirety including the specification, drawings and abstract.

BACKGROUND

1. Technical Field

The present disclosure relates to an automated valet parking system.

2. Description of Related Art

Conventionally, Japanese Unexamined Patent Application Publication No. 2019-36057 (JP 2019-36057 A) is known as a technical document relating to an automated valet parking system. This publication discloses a technique that generates a route composed of a series of coordinate information on a planned traveling route of an autonomous driving vehicle and a schedule composed of a series of time information on a scheduled passage time associated with each piece of the coordinate information on the route and, according to the generated route and the generated schedule, parks the vehicle in automated valet parking mode.

SUMMARY

In automated valet parking, an instruction is given to an autonomous driving vehicle by sending the information, required for the automated valet parking of the autonomous driving vehicle, from the parking place management server to the autonomous driving vehicle. In sending the information in this way, the information on the entire route in a parking place from a drop-off space to a target parking space, if sent to the autonomous driving vehicle at a time, may result in a risk that the amount of sending data becomes enormous and a large memory capacity is required for the autonomous driving vehicle.

One aspect of the present disclosure relates to an automated valet parking system that gives an instruction to an autonomous driving vehicle in a parking place to cause the autonomous driving vehicle to autonomously drive along a target route for parking the autonomous driving vehicle in a target parking space in the parking place. The automated valet parking system includes a vehicle position acquisition unit, a parking place map database, a node section identification unit, a target node identification unit, a node information acquisition unit, and a vehicle instruction unit. The vehicle position acquisition unit is configured to acquire a vehicle position of a target vehicle on a parking place map. The target vehicle is the autonomous driving vehicle driving autonomously according to the instruction. The parking place map database is configured to store parking place map information including node position information and node information. The node position information is information on a plurality of nodes that are set in advance corresponding to a plurality of passages in the parking place. The node information is information on driving boundaries and targets associated in advance with the nodes. The node section identification unit is configured to identify a node section in which the target vehicle is located based on the vehicle position of the target vehicle and the node position information. The target node identification unit is configured to identify target nodes that are a predetermined number of the nodes including a next-passing node. The next-passing node is one of not-yet-passed nodes of the target vehicle and is the node that the target vehicle will pass next on the target route. The predetermined number is smaller than a total number of the not-yet-passed nodes. The node information acquisition unit is configured to acquire the node information associated with the target nodes based on the target nodes and the parking place map information. The vehicle instruction unit is configured to give the instruction to the target vehicle by sending the node information associated with the target nodes to the target vehicle based on the acquisition result of the node information acquisition unit, the identification result of the node section identification unit, and the identification result of the target node identification unit.

According to the automated valet parking system in one aspect of the present disclosure, a predetermined number of nodes including the next-passing node are identified as target nodes where the predetermined number is smaller than the total number of not-yet-passed nodes. The instruction is given to the target vehicle by sending the node information, associated with the target nodes, to the target vehicle. Therefore, when sending the information, the amount of sending data and the memory capacity required for the target vehicle (autonomous driving vehicle) becomes smaller than when the node information on the entire target route in the parking place, from the drop-off space to the target parking space, is sent to the target vehicle at a time.

In the automated valet parking system according to one aspect of the present disclosure, the target node identification unit may identify the target nodes in such a way that the predetermined number is larger when a vehicle speed of the target vehicle is equal to or higher than a predetermined vehicle speed threshold than when the vehicle speed is lower than the vehicle speed threshold. This allows an appropriate number of target nodes to be identified according to the vehicle speed of the target vehicle.

In the automated valet parking system according to one aspect of the present disclosure, the target node identification unit may identify the target nodes by using a plurality of the nodes arranged along the target route of the target vehicle as the not-yet-passed nodes. This eliminates the need to send the node information associated with nodes other than those on the target route.

According to the automated valet parking system in one aspect of the present disclosure, the amount of sending data and the memory capacity required for an autonomous driving vehicle become smaller than when the node information is sent to the autonomous driving vehicle at a time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings.

Figure 1:
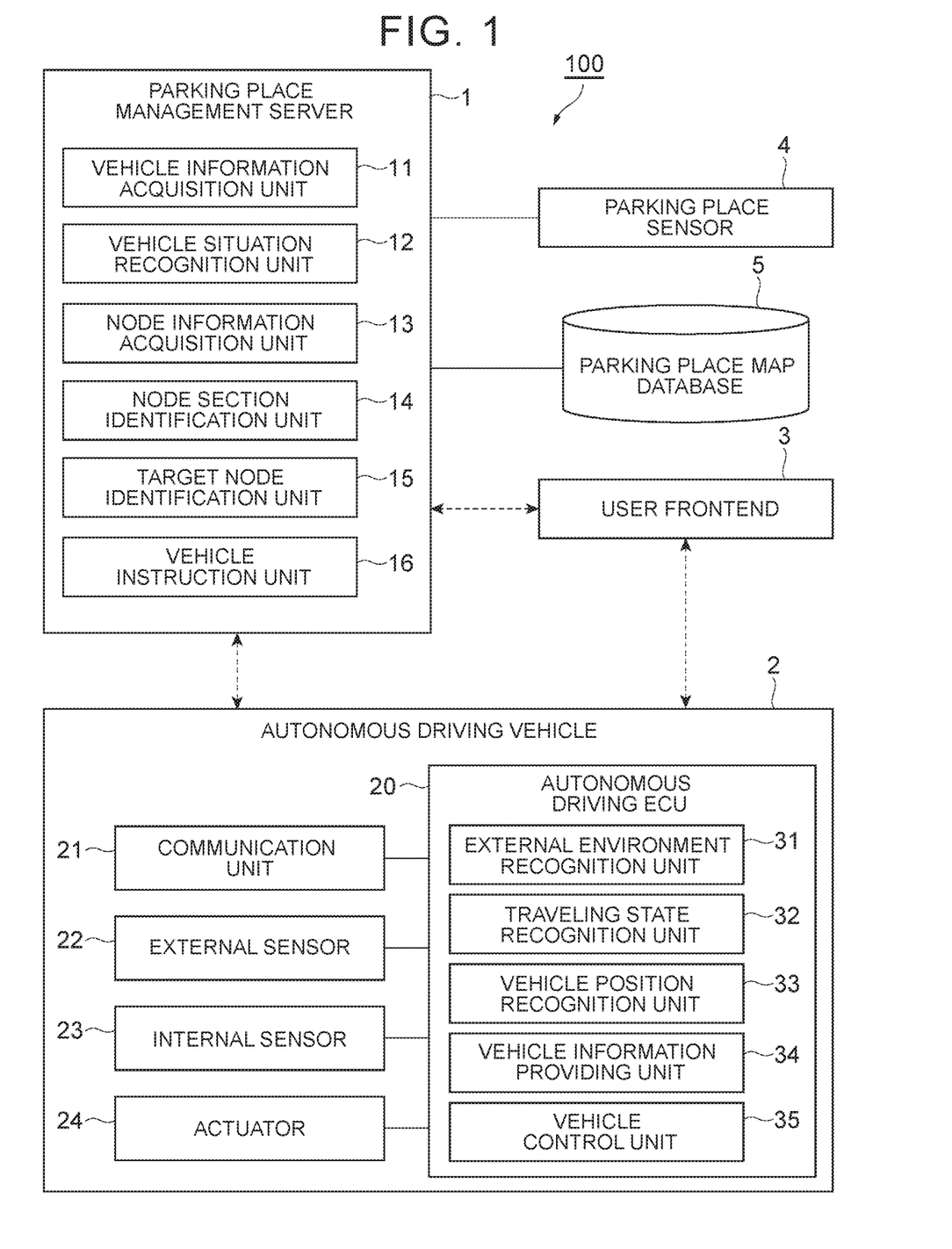
FIG. 1 is a block diagram showing an automated valet parking system according to one embodiment.

FIG. 1 is a block diagram showing an automated valet parking system 100 according to one embodiment. The automated valet parking system (AVPS) 100 shown in FIG. 1 is a system for parking an autonomous driving vehicle 2 in a parking place in automated valet parking mode.

Automated valet parking refers to a service in which an unmanned autonomous driving vehicle 2, from which the user (occupant) has gotten out in the drop-off area in the parking place, is driven along the target route according to an instruction from the parking place for parking the vehicle in a target parking space in the parking place in automated valet parking mode. The target parking space is a parking space that is set in advance as the parking position of the autonomous driving vehicle 2. The target route is a route in the parking place along which the autonomous driving vehicle 2 travels to reach the target parking space. Note that the target route at a pick-up time is a route along which the autonomous driving vehicle 2 travels to reach the pick-up space that will be described later.

The parking place may be a parking place dedicated to automated valet parking or may be a parking place both for vehicles that are parked in automated valet parking mode and for general vehicles that are not parked in automated valet parking mode. A part of the parking place for general vehicles may be used as an area dedicated to automated valet parking. In this embodiment, a parking place dedicated to automated valet parking is used as an example.

Figure 2:
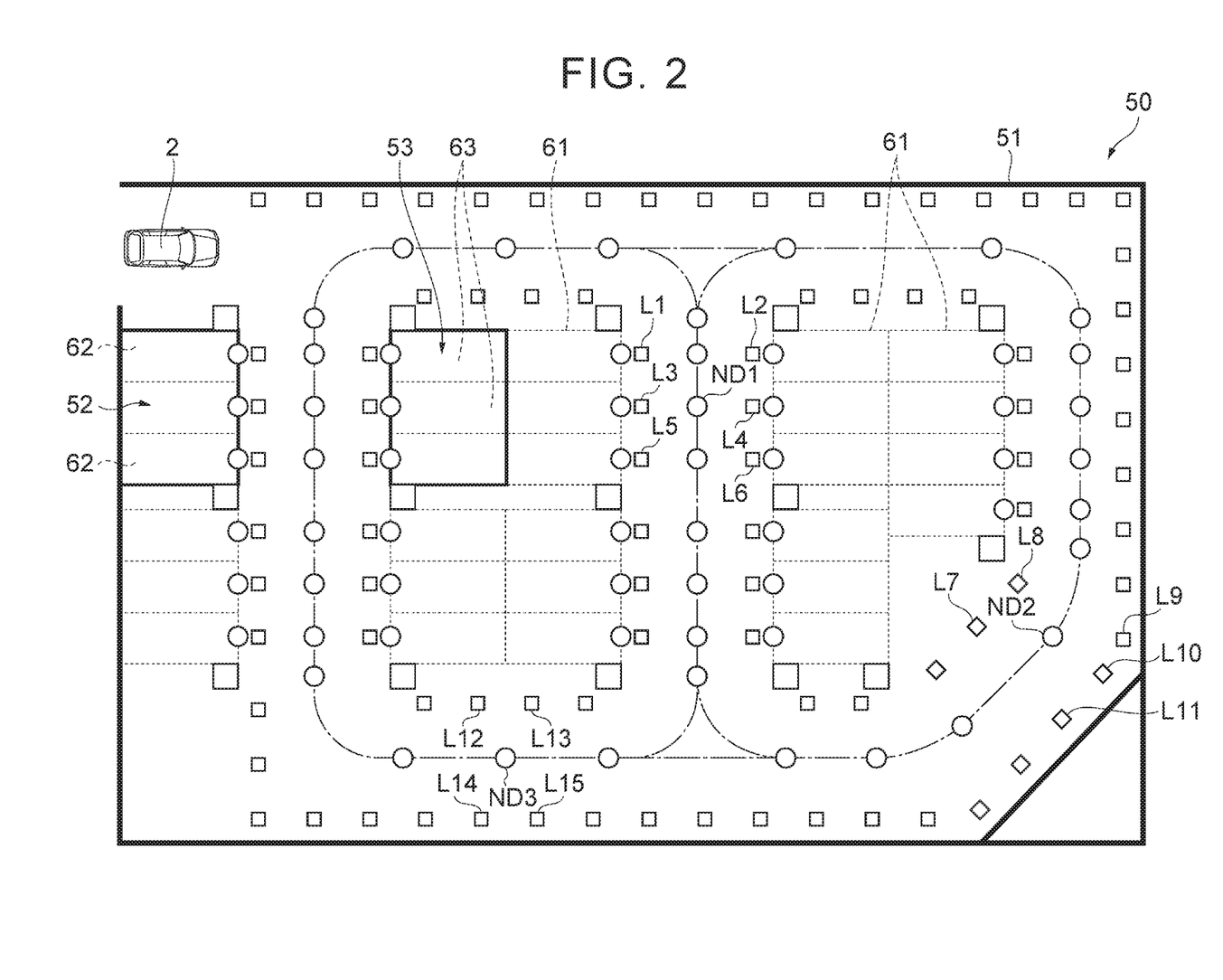
FIG. 2 is a plan view showing an example of a parking place where vehicles are parked in automated valet parking mode.
Figure 3:
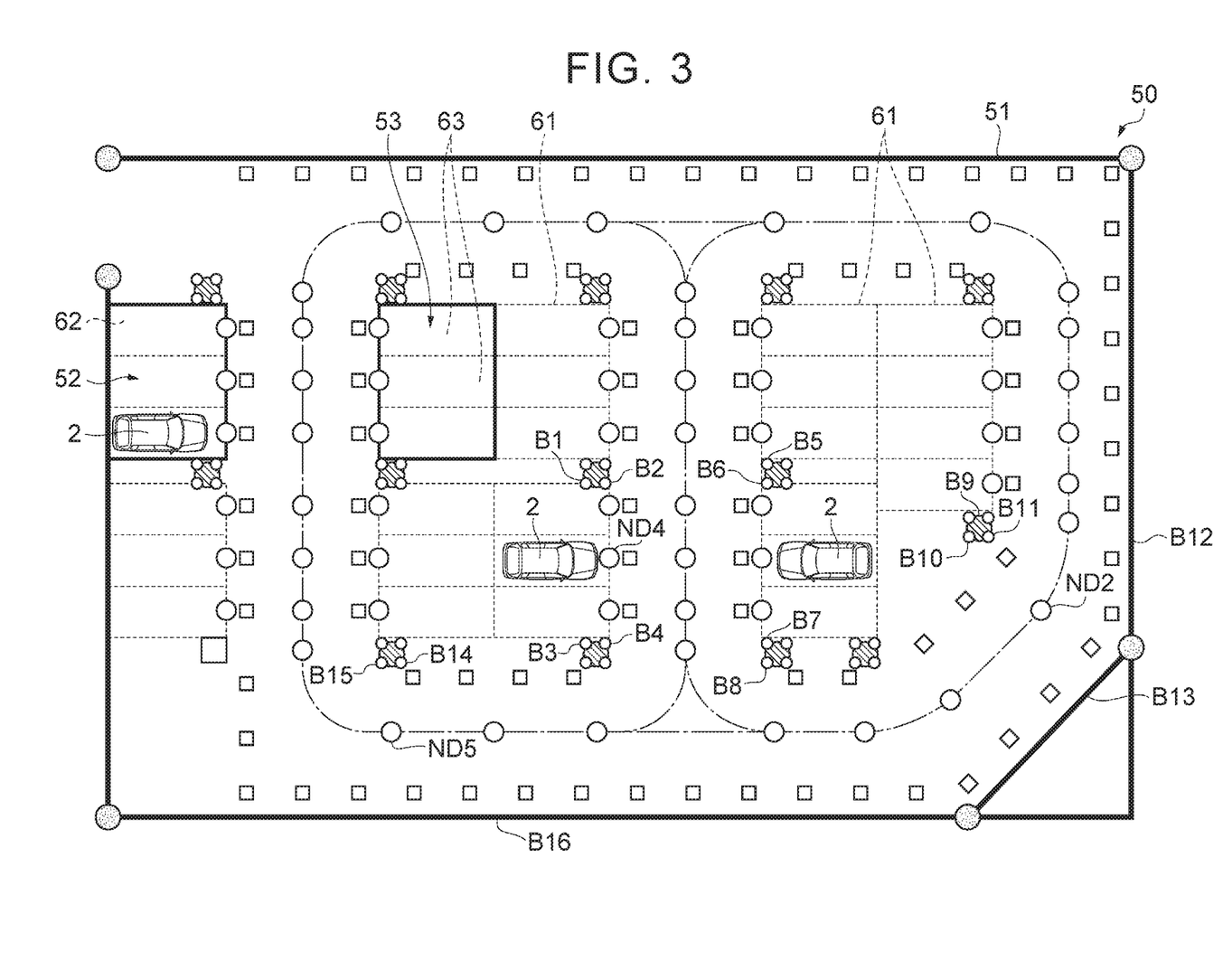
FIG. 3 is a plan view showing an example of a parking place where vehicles are parked in automated valet parking mode.

FIG. 2 and FIG. 3 are plan views showing an example of a parking place where vehicles are parked in automated valet parking mode. FIG. 2 and FIG. 3 show a parking place 50 for automated valet parking, a parking area 51, a drop-off area 52, and a pick-up area 53. The parking place 50 includes the parking area 51, the drop-off area 52, and the pick-up area 53. The drop-off area 52 and the pick-up area 53 do not need to be provided separately but may be provided as an integrated pick-up/drop-off area.

The parking area 51 is an area where parking spaces (each delimited by parking space markings) 61 are provided in which the autonomous driving vehicles 2 are parked in automated-valet parking mode. For example, as shown in FIG. 2 and FIG. 3, a plurality of parking spaces 61 are provided side by side in one direction (in the width direction of parked vehicles). The drop-off area 52, provided near the entrance of the parking place 50, is an area where the occupants, including the user, get out of the autonomous driving vehicle 2 before parking. The drop-off area 52 includes drop-off spaces 62 each of which is a space for stopping the autonomous driving vehicle 2 when the occupants get out at a drop-off time.

The pick-up area 53, provided near the entrance of the parking place 50, is an area for the occupants to get in the autonomous driving vehicle 2 that has been picked up. The pick-up area 53 includes pick-up spaces 63 each of which is a space for the autonomous driving vehicle 2 to wait for the occupants to get in the autonomous driving vehicle 2.

For example, after the autonomous driving vehicle 2 enters the parking place 50 and the occupants get out of the autonomous driving vehicle 2 in the drop-off space 62, the automated valet parking system 100 obtains the instruction authority of the autonomous driving vehicle 2 and starts automated valet parking. The automated valet parking system 100 drives the autonomous driving vehicle 2 toward the target parking space in the parking area 51 and parks the autonomous driving vehicle 2 in the target parking space. In response to a pick-up request, the automated valet parking system 100 drives the parked autonomous driving vehicle 2 toward the pick-up area 53 and keeps the autonomous driving vehicle 2 waiting in the pick-up space 63 until the occupants arrive.

When the autonomous driving vehicle 2 is traveling toward the target parking space in the parking area 51, or is traveling toward the pick-up area 53, in automated valet parking mode, the automated valet parking system 100 gives an instruction to the autonomous driving vehicle 2 by sending the information on the driving boundaries and the landmarks (targets) to the autonomous driving vehicle 2. Details of the sending of the information to the autonomous driving vehicle 2 will be described later.

Configuration of Automated Valet Parking System

A configuration of the automated valet parking system 100 will be described below with reference to the drawings. As shown in FIG. 1, the automated valet parking system 100 includes a parking place management server 1. The parking place management server 1 is a server for managing the parking place.

The parking place management server 1 is configured to be able to communicate with the autonomous driving vehicle 2 and a user frontend 3. The details of the autonomous driving vehicle 2 and the user frontend 3 will be described later. The parking place management server 1 may be provided in the parking place or may be provided in a facility remote from the parking place. The parking place management server 1 may be configured by a plurality of computers provided in different places.

The parking place management server 1 is connected to a parking place sensor 4 and a parking place map database 5. The parking place sensor 4 is a parking place facility sensor (infrastructure sensor) for recognizing the situation in the parking place 50. The parking place sensor 4 includes a vacancy detection sensor for detecting whether a vehicle is parked in each parking space (whether each parking space is occupied or vacant).

The vacancy detection sensor may be provided for each parking space, or may be configured to be provided on the ceiling or the like so that one vacancy detection sensor can monitor a plurality of parking spaces. The configuration of the vacancy detection sensor is not particularly limited and any known configuration may be employed. The vacancy detection sensor may be a pressure sensor, a radar sensor or a sonar sensor using radio waves, or a camera. The vacancy detection sensor sends the detection information, which indicates whether a vehicle is parked in a parking space, to the parking place management server 1.

The parking place sensor 4 may include a monitor camera for detecting the autonomous driving vehicle 2 traveling on a traveling path in the parking place 50. The monitor camera is installed on the ceiling or the wall of the parking place to capture the autonomous driving vehicle 2 that is traveling. The monitor camera sends the captured image to the parking place management server 1.

The parking place map database 5 is a database that stores the parking place map information. The parking place map information includes the position information on the parking spaces in the parking place, the position information on the drop-off spaces, the position information on the pick-up spaces, and the information on the traveling paths in the parking place. In addition, the parking place map information includes the node position information on a plurality of nodes that are set in advance corresponding to a plurality of passages in the parking place, the position information on the driving boundaries used for the autonomous driving of the autonomous driving vehicle 2, and the position information on the landmarks used by the autonomous driving vehicle 2 for position recognition.

In FIG. 2 and FIG. 3, a plurality of nodes that is set in advance corresponding to the plurality of passages in the parking place 50 is indicated by circles. For example, the plurality of nodes is set in such a way that the node positions are separated at predetermined intervals along a virtual line extending substantially in the center of the plurality of passages in the parking place 50. In the examples in FIG. 2 and FIG. 3, virtual lines extending along the plurality of passages in the parking place 50 are assumed as indicated by dashed lines and, on the virtual lines, the plurality of nodes is set. The predetermined interval does not necessarily have to be constant.

For example, in a straight section of a passage, a pair of nodes is set at the endpoints (start point and end point) of the straight section. These nodes are used for the autonomous driving vehicle 2 to autonomously drive the straight section. Nodes may be further set in a section between the endpoints of the straight section of a passage.

In a straight section of a passage, when the entrance of each of the parking spaces 61 faces the section between the endpoints of a straight section, a node is set in front of each of the parking spaces 61 and, at the same time, another node is set on the markings corresponding to the entrance of the parking space 61. When the autonomous driving vehicle 2 is parked in the parking space 61 in automated valet parking mode, these nodes are used to send the information on the driving boundaries and the landmarks around the parking space 61 to the autonomous driving vehicle 2. Nodes may be further set around the parking space 61.

In addition, a curved section of a passage is defined by the nodes at the endpoints (endpoints on the curved section side) of the straight sections that are adjacent to each other so as to sandwich the curved section. For example, a pair of nodes that are the endpoints of a curved section of a passage (nodes corresponding to the start point and the end point of the curve) may overlap with the nodes at the endpoints of the straight sections adjacent to each other. In a curved section of a passage, the virtual line described above can be assumed to be a curve connecting these nodes. These nodes are used by the autonomous driving vehicle 2 to autonomously drive the curved section. Nodes may be further set in a section sandwiched between the nodes at the endpoints of the adjacent straight sections (in the description below, such a section between the nodes is simply referred to as a "curved section").

The driving boundaries described above mean an object that can define a travelable range in which the autonomous driving vehicle 2 travels autonomously. As the driving boundaries, the position on an object provided permanently in the parking place 50 may be used. For example, as a driving boundary, the boundary between a passage of the autonomous driving vehicle 2 and a sidewalk (for example, curbs and white lines) may be used. In addition, as a driving boundary, at least one of a predetermined position on the surface of a pillar (for example, the vertex) in the parking place 50, a predetermined position on the surface of a wall of the parking place 50, a position where a pole is installed, a position where a safety cone is installed, and a position where a road stud is installed may be used. The landmarks described above mean an object that is the reference of a relative position used for recognizing the position of the autonomous driving vehicle 2 in the parking place 50. As a landmark, an object provided permanently in the parking place 50 may be used. For example, as a landmark, at least one of a pillar in the parking place 50, a wall of the parking place 50, a pole, a safety cone, and a road stud is used.

The parking place map information further includes node label information relating to the type of a node. The node label information means the information that is assigned to each node as a label indicating the type of the node. The type of a node means the type of the position of a node in the parking place 50. The types of a node include a first node type indicating that the node is located near a parking space, a second node type indicating that the node is located in a curved section, and a third node type indicating that the node is located neither near a parking space and nor in a curved section. A node of the third node type is located in a straight section.

In this embodiment, the position information on a landmark is associated in advance with a node as the node information on the landmark. The number of landmarks associated with a node may be fixed regardless of the node or may be different for each node according to the type of the node. The landmarks associated with a node may be determined according to the distance from the node. In the example shown in FIG. 2, a plurality of landmarks in the parking place 50 is indicated by small squares. For example, landmarks L1 to L6 are associated in advance with node ND1 located near a parking space. For example, landmarks L7 to L11 are associated in advance with node ND2 located in a curved section. For example, landmarks L12 to L15 are associated in advance with node ND3 located in a straight section (located neither near a parking space nor in a curved section).

The position information on a driving boundary is associated in advance with a node as the node information on the driving boundary. The number of driving boundaries associated with a node may be fixed regardless of the node or may be different for each node according to the type of the node. The driving boundaries associated with a node may be determined according to the distance from the node. In the example shown in FIG. 3, a plurality of pillars in the parking place 50 is indicated by hatched squares. The positions of the vertexes on the surface of each pillar, which are driving boundaries, are indicated by small circles. In addition, the vertices of the parking place 50 area are indicated by hatched circles, and the straight lines connecting the vertices are used as driving boundaries. For example, driving boundaries B1 to B8 are associated in advance with node ND4 located near a parking space. For example, driving boundaries B9 to B13 are associated in advance with node ND2 located in a curved section. For example, driving boundaries B14 to B16 are associated in advance with the node ND5 located in a straight section (located neither near a parking space nor in a curved section).

Figure 4:
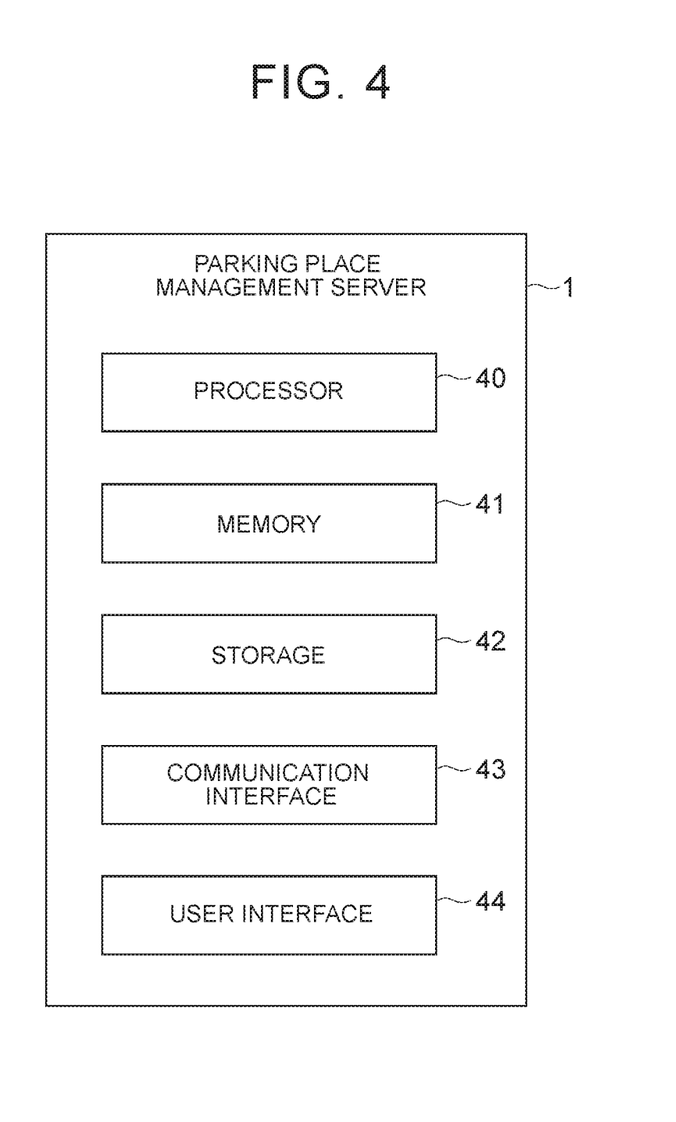
FIG. 4 is a block diagram showing an example of a hardware configuration of a parking place management server.

Next, a hardware configuration of the parking place management server 1 will be described. FIG. 4 is a block diagram showing an example of a hardware configuration of the parking place management server 1. As shown in FIG. 4, the parking place management server 1 is configured as a general computer including a processor 40, a memory 41, a storage 42, a communication interface 43, and a user interface 44.

The processor 40 operates various operating systems to control the parking place management server 1. The processor 40 is an arithmetic unit such as a central processing unit (CPU) that includes a control device, an arithmetic device, registers, and the like. The processor 40 integrally controls the memory 41, storage 42, communication interface 43, and user interface 44. The memory 41 is a recording medium such as a read only memory (ROM) and a random access memory (RAM). The storage 42 is a recording medium such as a hard disk drive (HDD).

The communication interface 43 is a communication device for performing wireless communication via a network. For the communication interface 43, a network device, a network controller, a network card, and the like can be used. The parking place management server 1 uses the communication interface 43 to communicate with the autonomous driving vehicle 2 and the user frontend 3. The user interface 44 is the input/output unit of the parking place management server 1 for use by the administrator of the parking place management server 1. The user interface 44 includes an output device such as a display and a speaker and an input device such as a touch panel.

Next, a functional configuration of the parking place management server 1 will be described. As shown in FIG. 1, the parking place management server 1 includes a vehicle information acquisition unit (vehicle position acquisition unit) 11, a vehicle situation recognition unit 12, a node information acquisition unit 13, a node section identification unit 14, a target node identification unit 15, and a vehicle instruction unit 16.

The vehicle information acquisition unit 11 acquires the vehicle information on the autonomous driving vehicle 2 by communicating with the autonomous driving vehicle 2 to be parked in automated valet parking mode. The vehicle information includes the identification information on the autonomous driving vehicle 2 and the vehicle position information on the autonomous driving vehicle 2 in the parking place. The vehicle position information is the information on the vehicle position indicated by a position of the autonomous driving vehicle 2 on the parking place map. The identification information may be any information as long as the information can identify each of the autonomous driving vehicles 2. The identification information may be the identification number (ID number), the vehicle number, the reservation number of automated valet parking, and the like.

The vehicle information may include the vehicle type of the autonomous driving vehicle 2 or may include the vehicle number separately from the identification information. The vehicle information may include the parking reservation information such as a parking reservation time or may include a scheduled pick-up time. The vehicle information may include the body information such as the turning radius, total length, and vehicle width of the autonomous driving vehicle 2 or may include the information on the autonomous driving function of the autonomous driving vehicle 2. The information on the autonomous driving function may include the version information on autonomous driving.

The vehicle information may include the recognition result of the traveling state and the external environment of the autonomous driving vehicle 2. The recognition of the traveling state and the external environment will be described later. The vehicle information may include the information on the remaining travelable distance or the amount of remaining fuel of the autonomous driving vehicle 2.

The vehicle information acquisition unit 11 continuously acquires the vehicle information from the autonomous driving vehicle 2 while the autonomous driving vehicle 2 is traveling in automated valet parking mode. While the autonomous driving vehicle 2 is traveling in automated valet parking mode, the vehicle information acquisition unit 11 may continuously acquire the vehicle information from a particular autonomous driving vehicle 2 that is traveling autonomously according to an instruction (in the description below, this autonomous driving vehicle is referred to as a target vehicle 2). When the autonomous driving vehicle 2 different from the target vehicle 2 is traveling autonomously according to an instruction, the vehicle information acquisition unit 11 may continuously acquire the vehicle information from that different autonomous driving vehicle 2. When the target vehicle 2 and/or the autonomous driving vehicle 2 are parked, the vehicle information acquisition unit 11 may suspend the acquisition of the vehicle information or may acquire the vehicle information periodically. Note that, in the description below, the expression "different autonomous driving vehicle 2" or "another autonomous driving vehicle 2" does not include the target vehicle 2 and that the expression "autonomous driving vehicle 2" includes the target vehicle 2.

The vehicle situation recognition unit 12 recognizes the situation of the autonomous driving vehicles 2 that are traveling in automated valet parking mode, based on the vehicle information acquired by the vehicle information acquisition unit 11. The situation of the autonomous driving vehicle 2 includes the vehicle positions of a plurality of autonomous driving vehicles 2 that is traveling autonomously.

The node information acquisition unit 13 acquires the node information based on the vehicle positions, recognized by the vehicle situation recognition unit 12, and the parking place map information. The node information is the information on the driving boundaries and the landmarks associated with each of the plurality of nodes. For example, the node information includes the position information on the driving boundaries and the landmarks around a node.

Based on the node information associated in advance with each node and based on the target nodes that will be described later, the node information acquisition unit 13 acquires the node information associated with the target nodes so that the vehicle instruction unit 16, which will be described later, can send the node information to the target vehicle 2. For example, for one or more nodes identified as the target nodes by the target node identification unit 15 that will be described later, the node information acquisition unit 13 acquires the position information on the landmarks and the position information on the driving boundaries that are associated in advance with the target nodes.

The node section identification unit 14 identifies the node section in which the target vehicle 2 is located, based on the vehicle position of the target vehicle 2 and the node position information. A node section refers to a section from one node to another node, for example, a section sandwiched between the two adjacent nodes. A node section may be a section sandwiched between two non-adjacent nodes.

For example, a node section may be a section that includes near nodes in the traveling direction of the target vehicle 2 and does not include distant nodes in the traveling direction of the target vehicle 2. In this case, to update a node section, the node section identification unit 14 determines whether the vehicle position of the target vehicle 2 has reached the position of the next-passing node. The next passing node is one of the not-yet-passed nodes of the target vehicle 2 and is a node that the target vehicle 2 will pass next on the target route. For example, when the vehicle position of the target vehicle 2 has reached a virtual straight line passing through the next passing node and extending in the width direction of the passage of the parking place 50, the node section identification unit 14 determines that the vehicle position of the target vehicle 2 has reached the position of the next passing node.

The node section identification unit 14 determines whether the vehicle position of the target vehicle 2 has reached the position of the next-passing node. When the node section identification unit 14 determines that vehicle position of the target vehicle 2 has reached the position of the next-passing node, the node section identification unit 14 re-identifies a node section having the next-passing node, reached by the target vehicle 2, as its starting point. At the same time, the node section identification unit 14 re-sets the next-passing node in such a way that the further next node of the current next passing node, reached by the target vehicle 2, becomes a new next passing node. The method of updating a node section is not limited to the above example.

The target node identification unit 15 identifies target nodes. Target nodes mean the nodes the node information of which is to be sent when the node information is sent to the target vehicle 2. The target nodes include the next-passing node of the target vehicle 2. That is, the node information on the next-passing node, which is necessary for the target vehicle 2 to continue autonomous driving, is sent to the target vehicle 2 when the node information is sent to the target vehicle 2.

The target nodes include a predetermined number of nodes smaller than the total number of not-yet-passed nodes. The predetermined number is a number, for example, smaller than the total number of not-yet-passed nodes on the target route. The not-yet-passed nodes on the target route mean one or more nodes provided along the target route from the current vehicle position of the target vehicle 2 to the destination (for example, target parking space or pick-up space). By setting the number of target nodes on the target route smaller than the total number of not-yet-passed nodes on the target route, the amount of sending data and the memory capacity required for the target vehicle 2 become smaller than when the node information on the entire target route in the parking place, from the drop-off space to the target parking space, is sent to the target vehicle 2 at a time, for example, at a parking time. Similarly, at a pick-up time, the amount of sending data and the memory capacity required for the target vehicle 2 become smaller than when the node information on the entire target route in the parking place, from the parking space to the pick-up space, is sent at a time to the target vehicle 2.

The target nodes may include not only the not-yet-passed nodes on the target route of the target vehicle 2 but also not-yet-passed nodes on a route other than the target route of the target vehicle 2. Not-yet-passed nodes on a route other than the target route mean one or more nodes along a branch route branching off and extending from a halfway point of the target route from the current vehicle position of the target vehicle 2 toward the destination. In this case, the predetermined number of target nodes is the sum of the number of not-yet-passed nodes that are on the target route and are identified as target nodes and the number of not-yet-passed nodes that are on a route other than the target route and are identified as target nodes. In this case, too, the predetermined number of target nodes is smaller than the total number of not-yet-passed nodes on the target route.

A branch route means a route that branches off from the target route calculated at the current vehicle position of the target vehicle 2 and on which the target vehicle 2 will travel due to an emergency evacuation instruction and the like that may occur in the future. An evacuation instruction is an instruction for evacuating the target vehicle 2 to a position, such as an empty parking space or the side of a traveling path, that does not obstruct the traveling of a failing vehicle. For example, when the target route is a route that runs straight ahead at an intersection, the branch route is at least one of a route that includes not-yet-passed nodes in the left-turn side and a route that includes not-yet-passed node in right-turn side.

The target node identification unit 15 may increase the predetermined number of nodes according to an increase in the vehicle speed of the target vehicle 2. Similarly, the target node identification unit 15 may decrease the predetermined number of nodes according to a decrease in the vehicle speed of the target vehicle 2. For example, the target node identification unit 15 may identify target nodes in such a way that the predetermined number is larger (for example, N1) when the vehicle speed of the target vehicle 2 is equal to or higher than the predetermined vehicle speed threshold than when the vehicle speed is lower than the vehicle speed threshold (for example, N2). The vehicle speed threshold is a vehicle speed threshold for switching the predetermined number of target nodes. Therefore, by increasing or decreasing the predetermined number according to an increase or a decrease in the vehicle speed, a change in the number of target nodes included in a section of the distance traveled by the target vehicle 2 in a certain period of time can be reduced.

Alternatively, the target node identification unit 15 may set the predetermined number according to the type of target nodes. The type of target nodes is the type of a node included in the target nodes. For example, as the type of target nodes, the type of the next-passing node may be used.

For example, the target node identification unit 15 may identify target nodes in such a way that the predetermined number is larger (for example, N3) when the type of the target node is the first node type than when the type of the target node is not the first node type (for example, N4 and N5). The target node identification unit 15 may identify target nodes in such a way that the predetermined number is larger (for example, N4) when the type of the target node is the second node type than when the type of the target node is not the second node type (for example, N5). The target node identification unit 15 may identify target nodes in such a way that the predetermined number is N5 when the type of the target node is neither the first node type nor the second node type.

The vehicle instruction unit 16 gives an instruction to the autonomous driving vehicle 2 to be parked in automated valet parking mode. At the time when automated valet parking is started for the autonomous driving vehicle 2, the vehicle instruction unit 16 gives an instruction indicating a target route for the autonomous driving vehicle 2 to reach the target parking space. The method for determining the target parking space is not particularly limited. For example, parking spaces may be allocated from the exit side in the order in which the vehicles enter the parking place or parking spaces may be allocated from the exit side in the order of pick-up reservation times. The vehicle instruction unit 16 may ask user to specify a target parking space. The vehicle instruction unit 16 does not need to send an instruction about all of the target route, from the current position of the autonomous driving vehicle 2 to the target parking space, at a time; instead, the vehicle instruction unit 16 may give an instruction about a part of the target route. At the pick-up time of the autonomous driving vehicle 2, the vehicle instruction unit 16 gives an instruction about a target route to reach the pick-up space 63.

The vehicle instruction unit 16 calculates a target route from the position of the target vehicle 2 to the target parking space based on the vehicle position of the target vehicle 2 acquired by the vehicle information acquisition unit 11. For example, as a target route, the vehicle instruction unit 16 calculates a route that can reach the target parking space with the shortest traveling distance along the traveling path in the parking place. The vehicle instruction unit 16 may calculate a new target route of the target vehicle 2 so as not to intersect with the target route of another autonomous driving vehicle 2. The vehicle instruction unit 16 may determine a target parking space in consideration of the target route. The vehicle instruction unit 16 may give an instruction about the upper limit of the vehicle speed in the parking place together with the target route. The vehicle instruction unit 16 may give an instruction about the upper limit of acceleration. The upper limit of the vehicle speed and the upper limit of acceleration are determined in advance.

The vehicle instruction unit 16 may give an instruction about the deceleration or acceleration of the target vehicle 2. The vehicle instruction unit 16 controls the stop and procession of the target vehicle 2 according to the situation of another autonomous driving vehicle 2 so that the target vehicle 2 can travel to the target parking space while avoiding an approach to the other autonomous driving vehicle 2. In this case, based on the acquired result of the node information acquisition unit 13, the identified result of the node section identification unit 14, and the identified result of the target node identification unit 15, the vehicle instruction unit 16 sends the node information, associated with the target nodes, to the target vehicle 2 to give an instruction to the target vehicle 2.

For example, when the target vehicle 2 reaches a new node section, the vehicle instruction unit 16 sends to the target vehicle the node information on the target nodes that are not-yet-passed nodes and are ahead of the next-passing node. The vehicle instruction unit 16 determines whether the node section identification unit 14 has re-identified the node section. When the vehicle instruction unit 16 determines that the node section identification unit 14 has re-identified the node section, the vehicle instruction unit 16 sends the node information, associated with the target nodes, to the target vehicle 2. The vehicle instruction unit 16 may send the node information on the target nodes to the target vehicle before reaching a new node section (while the target vehicle 2 is traveling in the current node section).

Next, the autonomous driving vehicle 2 and the user frontend 3 that communicate with the parking place management server 1 will be described. Note that the automated valet parking system 100 according to this embodiment does not need to include the autonomous driving vehicle 2 and the user frontend 3.

As shown in FIG. 1, the autonomous driving vehicle 2 has, for example, an autonomous driving ECU 20. The autonomous driving ECU 20 is an electronic control unit including a CPU, a ROM, a RAM, and the like. The autonomous driving ECU 20 loads a program from the ROM into the RAM and causes the CPU executes the program, loaded in the RAM, for implementing various functions. The autonomous driving ECU 20 may be configured by a plurality of electronic units.

The autonomous driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 sends and receives various information through communication with the parking place management server 1. For example, the communication unit 21 sends the vehicle information to the parking place management server 1 and, at the same time, acquires the information necessary for automated valet parking (for example, the information on landmarks along the target route) from the parking place management server 1. The communication unit 21 also communicates with the user frontend 3 associated with the autonomous driving vehicle 2.

The external sensor 22 is an in-vehicle sensor that detects the external environment of the autonomous driving vehicle 2. The external sensor 22 includes at least a camera. The camera is a capturing device that captures the external environment of the autonomous driving vehicle 2. The camera is provided, for example, on the reserve side of the windshield of the autonomous driving vehicle 2 to capture the image in front of the vehicle. The camera sends the captured information on the external environment of the autonomous driving vehicle 2 to the autonomous driving ECU 20. The camera may be a monocular camera or a stereo camera. A plurality of cameras may be provided not only for capturing the image in front of the autonomous driving vehicle 2 but also for capturing the image to the sides of (right and left) and behind the autonomous driving vehicle 2.

The external sensor 22 may include a radar sensor. The radar sensor is a detection device that detects an object around the autonomous driving vehicle 2 using radio waves (for example, millimeter waves) or light. The radar sensor includes, for example, a millimeter-wave radar or a lidar [LIDAR: Light Detection and Ranging]. The radar sensor sends electric waves or light to the area around the autonomous driving vehicle 2 for detecting an object by receiving the electric waves or light reflected by the object. The radar sensor sends the detected object information to the autonomous driving ECU 20. Furthermore, the external sensor 22 may include a sonar sensor that detects a sound outside the autonomous driving vehicle 2.

The internal sensor 23 is an in-vehicle sensor that detects the traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, a wheel speed sensor may be used that is provided on the wheels of the autonomous driving vehicle 2 or on the drive shaft that rotates in synchronization with the wheels for detecting the rotation speed of each wheel. The vehicle speed sensor sends the detected vehicle speed information (wheel speed information) to the autonomous driving ECU 20.

The acceleration sensor is a detector that detects the acceleration of the autonomous driving vehicle 2. The acceleration sensor includes, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor sends, for example, the acceleration information on the autonomous driving vehicle 2 to the autonomous driving ECU 20. The yaw rate sensor is a detector that detects the yaw rate (rotation angle speed) around the vertical axis of the center of gravity of the autonomous driving vehicle 2. For example, a gyro sensor may be used as the yaw rate sensor. The yaw rate sensor sends the detected yaw rate information on the autonomous driving vehicle 2 to the autonomous driving ECU 20.

The actuator 24 is a device used for controlling the autonomous driving vehicle 2. The actuator 24 includes at least a drive actuator, a brake actuator, and a steering actuator. The drive actuator controls the amount of air to be supplied to the engine (throttle valve opening degree) according to the control signal from the autonomous driving ECU 20 for controlling the driving force of the autonomous driving vehicle 2. When the autonomous driving vehicle 2 is a hybrid vehicle, not only the amount of air to be supplied to the engine but also the control signal from the autonomous driving ECU 20 to the motor, which works as the power source, is input for controlling the driving force. When the autonomous driving vehicle 2 is an electric vehicle, the control signal from the autonomous driving ECU 20 is input to the motor, which works as the power source, for controlling the driving force. The motor that works as the power source in these cases constitutes the actuator 24.

The brake actuator controls the brake system according to the control signal from the autonomous driving ECU 20 for controlling the braking force applied to the wheels of the autonomous driving vehicle 2. For example, a hydraulic brake system can be used as the brake system. The steering actuator controls the driving of the assist motor, which is included in the electric power steering system for controlling the steering torque, according to the control signal from the autonomous driving ECU 20. In this way, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a vehicle information providing unit 34, and a vehicle control unit 35.

The external environment recognition unit 31 recognizes the external environment of the autonomous driving vehicle 2 based on the detection result of the external sensor 22 (an image captured by the camera or the object information detected by the radar sensor). The external environment includes the relative position of a surrounding object with respect to the autonomous driving vehicle 2. The external environment may include the relative speed and the moving direction of a surrounding object with respect to the autonomous driving vehicle 2. The external environment recognition unit 31 recognizes objects, such as another vehicle and the pillars of the parking place, by pattern matching or the like. The external environment recognition unit 31 may recognize the gate of the parking place, walls of the parking place, poles, safety cones, and the like. Furthermore, the external environment recognition unit 31 may recognize the driving boundaries in the parking place by recognizing white lines The traveling state recognition unit 32 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. More specifically, the traveling state recognition unit 32 recognizes the vehicle speed of the autonomous driving vehicle 2 based on the vehicle speed information detected by the vehicle speed sensor. The traveling state recognition unit 32 recognizes the acceleration of the autonomous driving vehicle 2 based on the acceleration information detected by the acceleration sensor. The traveling state recognition unit 32 recognizes the direction of the autonomous driving vehicle 2 based on the yaw rate information detected by the yaw rate sensor.

The vehicle position recognition unit 33 recognizes the position of the autonomous driving vehicle 2 in the parking place based on the parking place map information, acquired from the parking place management server 1 through the communication unit 21, and the external environment recognized by the external environment recognition unit 31.

The vehicle position recognition unit 33 recognizes the position of the autonomous driving vehicle 2 in the parking place based on the position information on the landmarks in the parking place, included in the parking place map information, and the relative position of the landmarks with respect to the autonomous driving vehicle 2 recognized by the external environment recognition unit 31.

In addition, the vehicle position recognition unit 33 may recognize the position of the autonomous driving vehicle 2 by dead reckoning based on the detection result of the internal sensor 23. Furthermore, the vehicle position recognition unit 33 may recognize the position of the autonomous driving vehicle 2 by communicating with the beacon provided in the parking place.

The vehicle information providing unit 34 provides the vehicle information to the parking place management server 1 through the communication unit 21. The vehicle information providing unit 34 provides the vehicle information, which includes the information on the position of the autonomous driving vehicle 2 in the parking place recognized by the vehicle position recognition unit 33, to the parking place management server 1, for example, at regular intervals.

The vehicle control unit 35 causes the autonomous driving vehicle 2 to travel in autonomous driving mode. In autonomous driving mode, the vehicle control unit 35 causes the autonomous driving vehicle 2 to autonomously travel along the target route specified by the parking place management server 1. The vehicle control unit 35 generates the trajectory of the autonomous driving vehicle 2, for example, based on the target route, the position of the autonomous driving vehicle 2, the external environment of the autonomous driving vehicle 2, and the traveling state of the autonomous driving vehicle 2. The trajectory corresponds to the travel plan of autonomous driving. The trajectory includes a path on which the vehicle will travel autonomously and a vehicle speed plan used in autonomous driving mode.

The path is a planned locus along which an autonomously-traveling vehicle route will travel on the target. The path can be thought of as data on a change in the steering angle (steering angle plan) of the autonomous driving vehicle 2, for example, according to a position on the target route. A position on the target route is, for example, a set longitudinal position that is set at predetermined intervals (for example, 1 m) in the traveling direction of the target route. The steering angle plan is the data in which the target steering angle is associated with each set longitudinal position.

The vehicle control unit 35 generates a trajectory, for example, in such a way that the trajectory runs through the center of the traveling path in the parking place along the target route. When an instruction indicating the upper limit of the vehicle speed is received from the parking place management server 1, the vehicle control unit 35 generates a trajectory so that vehicle speed specified in the vehicle speed plan does not exceed the upper limit of the vehicle speed. The vehicle control unit 35 may generate a trajectory using the parking place map information acquired through communication with the parking place management server 1.

When the stop instruction is received from the parking place management server 1, the vehicle control unit 35 stops the autonomous driving vehicle 2. When the proceed instruction is received from the parking place management server 1, the vehicle control unit 35 causes the stopped autonomous driving vehicle 2 to proceed. An example of the configuration of the autonomous driving vehicle 2 has been described above. The configuration of the autonomous driving vehicle 2 is not limited to the configuration described above as long as the autonomous driving vehicle 2 can be parked in automated valet parking mode.

The user frontend 3 is a user's mobile information terminal associated with the autonomous driving vehicle 2. The user frontend 3 is registered in the autonomous driving vehicle 2, for example, as the terminal of the owner of the autonomous driving vehicle 2. The user frontend 3 may be the terminal of a temporary owner of a rental vehicle or the terminal of a user who has obtained instruction authority from the owner and is registered in the autonomous driving vehicle 2 as an authority owner. The user frontend 3 is configured by a computer including a processor such as a CPU, a memory such as a ROM or a RAM, and a user interface including a display with a touch panel.

The user frontend 3 has a function of sending a parking request and a pick-up request to the parking place management server 1. The user can make a parking request or a pick-up request for parking or picking up a vehicle in automated valet parking mode through the operation of the user frontend 3. For example, the user stops the autonomous driving vehicle 2 in the drop-off space 62 of the drop-off area 52 in the parking place 50 and gets out of the vehicle and, after that, the user gives instruction authority over the autonomous driving vehicle 2 to the parking place management server 1 through the operation of the user frontend 3 to complete the parking request.

The user makes a pick-up request to cause the parking place management server 1 to drive the autonomous driving vehicle 2, parked in the parking space 61, to the pick-up space 63 of the pick-up area 53. The autonomous driving vehicle 2 waits for the user in the pick-up space 63. For example, when the autonomous driving vehicle 2 arrives at the pick-up space 63 and stops there, the parking place management server 1 terminates the instruction authority over the autonomous driving vehicle 2. The instruction authority may be terminated when the user gives an instruction to the autonomous driving vehicle 2 to open the door or to start traveling. The autonomous driving vehicle 2 may also terminate the instruction authority. The operation performed by the autonomous driving vehicle 2 when a parking request or a pick-up request is sent is not limited to the operation described above. The same applies also to the operation performed by the parking place management server 1.

Processing of Automated Valet Parking System

Figure 5:
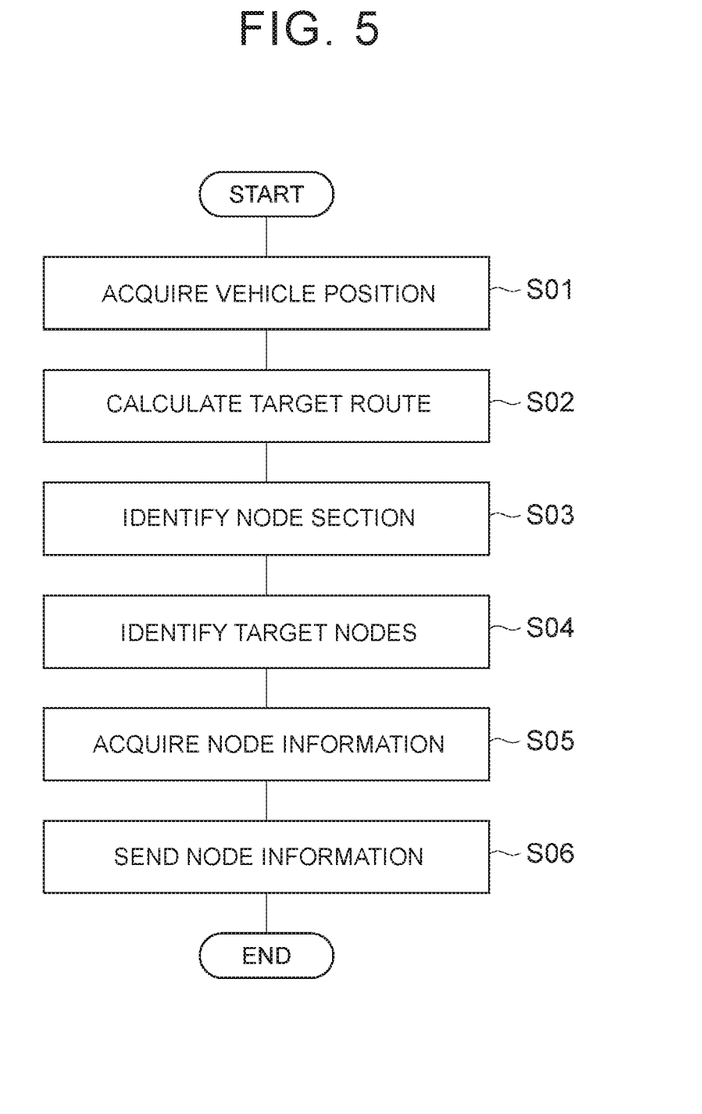
FIG. 5 is a flowchart showing an example of vehicle instruction processing.

Next, the processing of the automated valet parking system 100 will be described with reference to the drawings. FIG. 5 is a flowchart showing an example of the vehicle instruction processing. The vehicle instruction processing is executed after the start of automated valet parking, for example, when the autonomous driving vehicle 2 capable of communicating with the parking place management server 1 enters the parking place.

As shown in FIG. 5, in S01, the parking place management server 1 uses the vehicle information acquisition unit 11 to acquire the vehicle position of the target vehicle 2. In S02, the parking place management server 1 uses the vehicle instruction unit 16 to calculate a target route. In S03, the parking place management server 1 uses the node section identification unit 14 to identify the node section where the target vehicle 2 is located.

Figure 6:
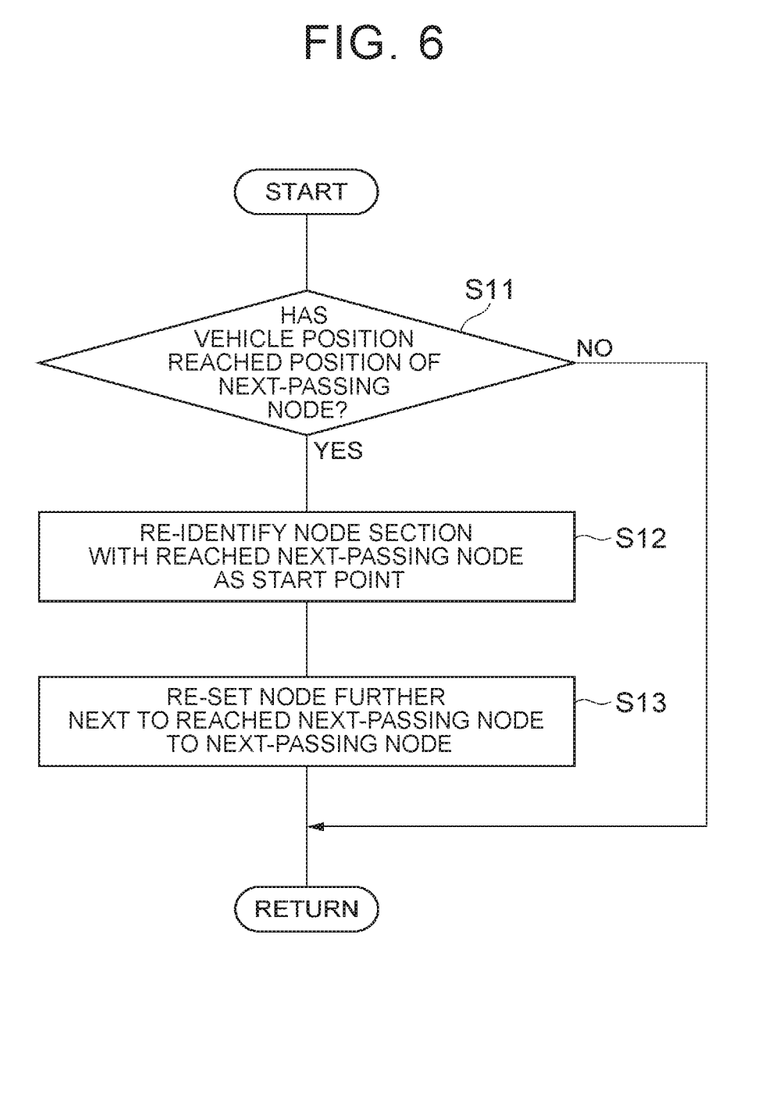
FIG. 6 is a flowchart showing an example of node section identification processing.

More specifically, the node section identification processing in S03 is performed as shown in FIG. 6. Note that, immediately after the start of automated valet parking, instead of performing the processing shown in FIG. 6, the section from the node immediately behind the vehicle position when automated valet parking is started to the node immediately ahead of the vehicle position may be identified as the node section and, at the same time, the node immediately ahead of the vehicle position may be set as the next-passing node.

FIG. 6 is a flowchart showing an example of the node section identification processing. As shown in FIG. 6, in S11, the parking place management server 1 uses the node section identification unit 14 to determine whether the vehicle position of the target vehicle 2 has reached the position of the next-passing node.

When the node section identification unit 14 determines that the vehicle position of the target vehicle 2 has reached the position of the next-passing node (S11: YES), the processing of the parking place management server 1 proceeds to S12. When the node section identification unit 14 does not determine that the vehicle position of the target vehicle 2 has reached the position of the next-passing node (S11: NO), the parking place management server 1 terminates the current processing in FIG. 6. After that, the parking place management server 1 performs the processing in FIG. 6, for example, when the processing in S03 is performed again.

In S12, the parking place management server 1 uses the node section identification unit 14 to re-identify the node section with the next-passing node, where the target vehicle 2 has reached, as the start point. In S13, the parking place management server 1 uses the node section identification unit 14 to re-set the node further next to the next-passing node, where the target vehicle 2 has reached, to a new next-passing node. Then, the processing in FIG. 6 is terminated. After that, the parking place management server 1 performs the processing in FIG. 6, for example, when the processing in S03 is performed again.

Returning to FIG. 5, in S04, the parking place management server 1 uses the target node identification unit 15 to identify the target nodes the information of which is to be sent to the target vehicle 2.

Figure 7:
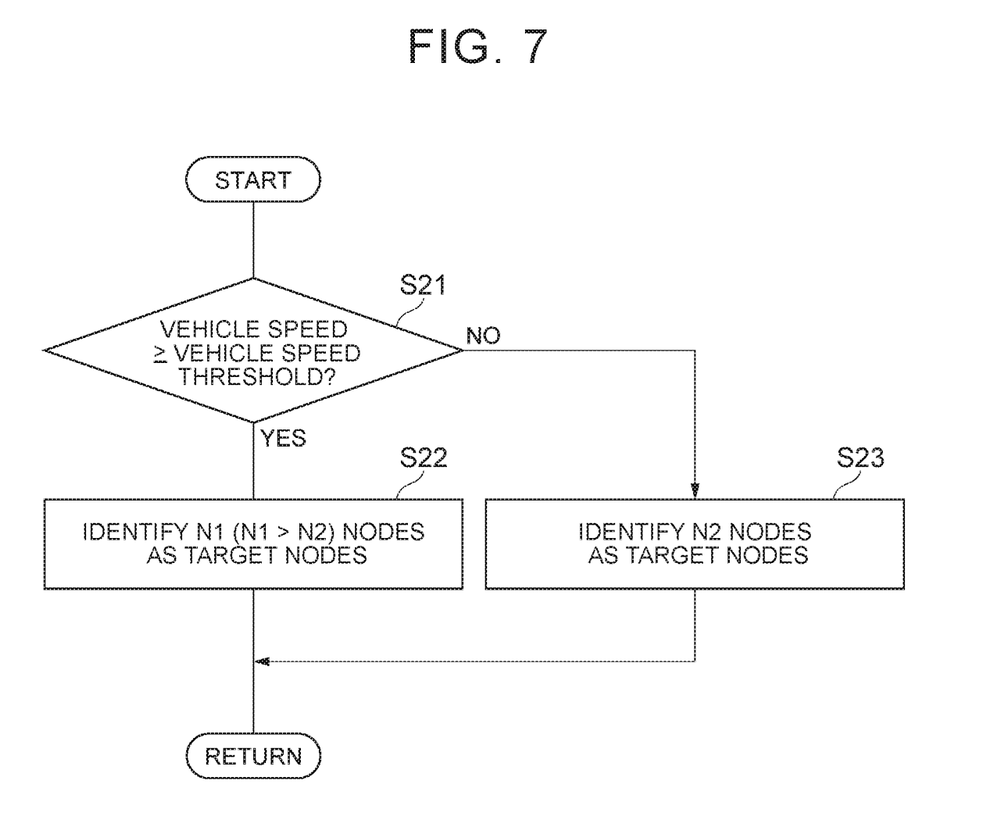
FIG. 7 is a flowchart showing an example of target node identification processing.

More specifically, the processing in S04 is performed as shown in FIG. 7. FIG. 7 is a flowchart showing an example of the target node identification processing. As shown in FIG. 7, in S21, the parking place management server 1 uses the target node identification unit 15 to determine whether the vehicle speed of the target vehicle 2 is equal to or higher than the predetermined vehicle speed threshold.

When the target node identification unit 15 determines that the vehicle speed of the target vehicle 2 is equal to or higher than the vehicle speed threshold (S21: YES), the processing of the parking place management server 1 proceeds to S22. When the target node identification unit 15 does not determine that the vehicle speed of the target vehicle 2 is equal to or higher than the vehicle speed threshold (S21: NO), the processing of the parking place management server 1 proceeds to S23.

In S22, the parking place management server 1 uses the target node identification unit 15 to identify, as the target nodes, N1 nodes that include the next-passing node where N1 is larger than N2. After that, the processing in FIG. 7 is terminated. On the other hand, in S23, the parking place management server 1 uses the target node identification unit 15 to identify, as target nodes, N2 nodes that include the next-passing node. After that, the parking place management server 1 terminates the current processing in FIG. 7. The parking place management server 1 performs the processing in FIG. 7, for example, when the processing in S04 is performed again.

Figure 8:
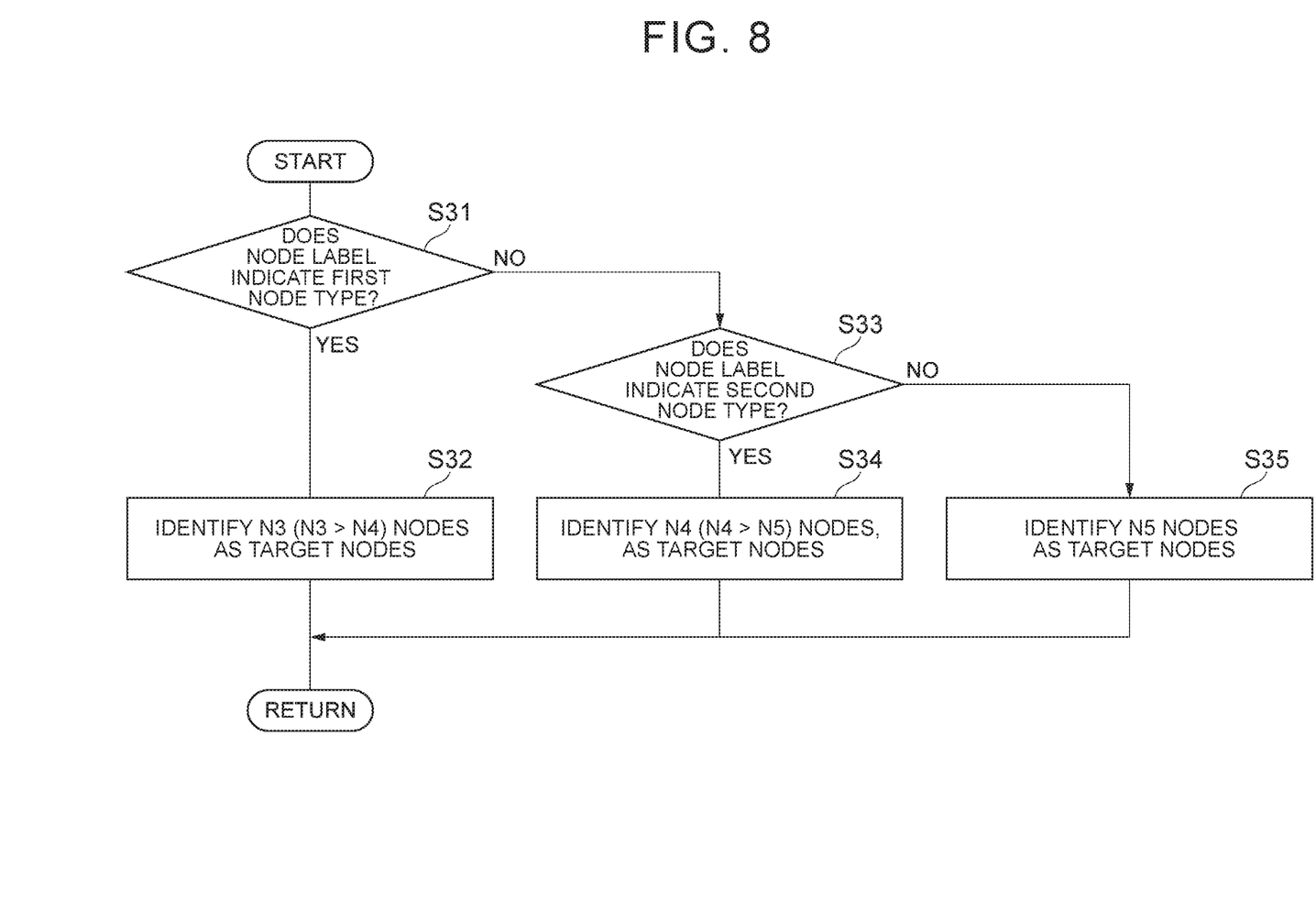
FIG. 8 is a flowchart showing another example of target node identification processing.

Alternatively, the processing in S04 may be performed as shown in FIG. 8. FIG. 8 is a flowchart showing another example of the target node identification processing. As shown in FIG. 8, the parking place management server 1 of the automated valet parking system 100 uses the target node identification unit 15 in S31 to determine whether the node label indicates the first node type (whether the node is located near a parking space). When the target node identification unit 15 determines that the node label indicates the first node type (S31: YES), the processing of the parking place management server 1 proceeds to S32. In S32, the parking place management server 1 uses the target node identification unit 15 to identify, as the target nodes, N3 nodes including the next-passing node where N3 is larger than N4. Then, the current processing in FIG. 8 is terminated. The parking place management server 1 may perform the processing in FIG. 8, for example, when the processing in S04 described above is performed again.

On the other hand, when the target node identification unit 15 determines that the node label does not indicate the first node type (S31: NO), the processing of the parking place management server 1 proceeds to S33. In S33, the parking place management server 1 uses the target node identification unit 15 to determine whether the node label indicates the second node type (whether the node is located in a curved section). When the target node identification unit 15 determines that the node label indicates the second node type (S33: YES), the processing of the parking place management server 1 proceeds to S34. In S34, the parking place management server 1 uses the target node identification unit 15 to identify, as the target node, N4 nodes including the next-passing node where N4 is larger than N5. Then, the current processing in FIG. 8 is terminated. The parking place management server 1 may perform the processing in FIG. 8, for example, when the processing in S04 described above is performed again.

On the other hand, when the target node identification unit 15 determines that the node label does not indicates the second node type (S33: NO), the processing of the parking place management server 1 proceeds to S35. In S35, the parking place management server 1 uses the target node identification unit 15 to identify, as the target node, N5 nodes including the next-passing node. Then, the current processing in FIG. 8 is terminated. The parking place management server 1 may perform the processing in FIG. 8, for example, when the processing in S04 described above is performed again.

Returning to FIG. 5, in S05, the parking place management server 1 uses the node information acquisition unit 13 to acquires the node information associated with the target nodes. In S06, the parking place management server 1 uses the vehicle instruction unit 16 to send the node information to the target vehicle 2. For example, when, the target vehicle 2 reaches a new node section, the vehicle instruction unit 16 sends the node information to the target vehicle 2. After that, the parking place management server 1 terminates the current processing. The parking place management server 1 repeats the processing in FIG. 5 again, for example, after a certain time has elapsed.

According to the automated valet parking system 100 in this embodiment described above, a predetermined number of nodes including the next-passing node are identified as target nodes where the predetermined number is smaller than the total number of not-yet-passed nodes. An instruction is given to the target vehicle 2 by sending the node information, associated with the target nodes, to the target vehicle 2. Therefore, when sending the information, the amount of sending data and the memory capacity required for the target vehicle 2 (autonomous driving vehicle 2) become smaller than when the node information on the entire target route in the parking place 50, from the drop-off space 62 to the target parking space, is sent to the target vehicle 2 at a time.

Furthermore, according to the automated valet parking system 100, when the vehicle speed of the target vehicle 2 is equal to or higher than the predetermined vehicle speed threshold, the target node identification unit 15 identifies N1 nodes as the target nodes where N1 is larger than N2 that is the predetermined number of target nodes identified when the vehicle speed is lower than the predetermined vehicle speed threshold. This allows an appropriate number of target nodes to be identified according to the vehicle speed of the target vehicle 2.

Furthermore, according to the automated valet parking system 100, the target node identification unit 15 identifies target nodes by using a plurality of nodes along the target route of the target vehicle 2 as not-yet-passed nodes. This eliminates the need to send the node information associated with the nodes other than those on the target route.

While the embodiments of the present disclosure have been described above, it is to be understood that the present disclosure is not limited to the specific embodiments described above. The present disclosure can be implemented not only by the embodiments described above but also in a variety of modes in which various changes and modifications are added based on the knowledge of those skilled in the art.

The parking place management server 1 does not need to be able to directly communicate with the autonomous driving vehicle 2 but may communicate with the autonomous driving vehicle 2 via another server or the like. The parking place management server 1 may communicate with the autonomous driving vehicle 2, for example, via the management server on the manufacturer side of the autonomous driving vehicle 2 or via the operation server of MaaS (Mobility as a Service). In this case, whether the communication is interrupted may be determined in the server via which the communication is performed.

The target node identification unit 15 does not necessarily need to change the predetermined number of target nodes according to the vehicle speed of the target vehicle 2.

As the types of nodes, the first node type where the node is located near a parking space, the second node type where the node is located in a curved section, and the third node type where the node is located neither near a parking space nor in a curved section are described above. Note that one or two of these three types may be omitted or that another type may be included. Also note that the parking place map information may not necessarily include the node label information on the type of a node.

In the above embodiment, the parking place map database 5 stores the position information on the driving boundaries and the position information on the landmarks by associating them with the nodes in advance for use as the node information. Such node information is not necessarily stored in the parking place map database 5. For example, such node information may be obtained from a provider different from the parking place map database 5 (for example, a map data production company) in the form in which the position information on the driving boundaries and the position information on the landmarks are associated in advance with the nodes as the node information.

In the embodiment, a node section includes, for example, the near nodes in the traveling direction of the target vehicle 2 and does not include the distant nodes in the traveling direction of the target vehicle 2. Conversely, a node section may not include the near nodes in the traveling direction of the target vehicle 2 but include the distant nodes in the traveling direction of the target vehicle 2.

What is claimed is:

1. An automated valet parking system that gives an instruction to an autonomous driving vehicle in a parking place to cause the autonomous driving vehicle to autonomously drive along a target route for parking the autonomous driving vehicle in a target parking space in the parking place, the automated valet parking system comprising a server configured to:

acquire a vehicle position of a target vehicle on a parking place map, the target vehicle being the autonomous driving vehicle driving autonomously according to the instruction;

store parking place map information including node position information and node information, the node position information being information on a plurality of nodes that are set in advance corresponding to a plurality of passages in the parking place, the node information being information on driving boundaries and targets associated in advance with the nodes;

identify a node section in which the target vehicle is located based on the vehicle position of the target vehicle and the node position information;

identify target nodes that are a predetermined number of the nodes including a next-passing node, the next-passing node being one of not-yet-passed nodes of the target vehicle and being a node that the target vehicle will pass next on the target route, the predetermined number being smaller than a total number of the not-yet-passed nodes;

acquire the node information associated with the target nodes based on the target nodes and the parking place map information; and give the instruction to the target vehicle by sending the node information associated with the target nodes to the target vehicle based on an acquisition result of the node information acquisition unit, an identification result of the node section identification unit, and the identification result of the target node identification unit.

2. The automated valet parking system according to claim 1, wherein the server identifies the target nodes in such a way that the predetermined number is larger when a vehicle speed of the target vehicle is equal to or higher than a predetermined vehicle speed threshold than when the vehicle speed is lower than the vehicle speed threshold.

3. The automated valet parking system according to claim 1, wherein the server identifies the target nodes by using a plurality of the nodes arranged along the target route of the target vehicle as the not-yet-passed nodes.

* * * * *